United States Patent [19]

Widhopf

[11] Patent Number: 4,697,748
[45] Date of Patent: Oct. 6, 1987

[54] METHOD AND APPARATUS FOR MACERATING AND WET-CRUSHING BREWING INGREDIENTS

[75] Inventor: Martin Widhopf, Freising, Fed. Rep. of Germany

[73] Assignee: Firma Steinecker Maschinefabrik GmbH, Freising, Fed. Rep. of Germany

[21] Appl. No.: 857,946

[22] Filed: May 1, 1986

[30] Foreign Application Priority Data

May 2, 1985 [DE] Fed. Rep. of Germany ....... 3515816

[51] Int. Cl.⁴ ............................................. B02C 23/18
[52] U.S. Cl. ........................................ 241/62; 99/536; 241/225; 426/518
[58] Field of Search ................ 426/518; 241/224, 225, 241/227, 62, 159, 41, 43; 99/275, 516, 277.1, 277.2, 536, 276

[56] References Cited

FOREIGN PATENT DOCUMENTS

| | | |
|---|---|---|
| 2945976 | 1/1983 | Fed. Rep. of Germany . |
| 2844827 | 9/1984 | Fed. Rep. of Germany . |
| 1202124 | 8/1970 | United Kingdom ............... 426/518 |
| 2062495 | 3/1980 | United Kingdom . |

Primary Examiner—Mark Rosenbaum
Attorney, Agent, or Firm—Finnegan, Henderson, Farabow, Garrett & Dunner

[57] ABSTRACT

The invention relates to a method for macerating and wet-crushing brewing ingredients, wherein the brewing ingredients are continuously taken from a supply container. Subsequently substantially equal portions of the brewing ingredients are conveyed along a circular path, and an excess of macerating water is added thereto. The excessive macerating water is collected and discarded, whereupon the brewing ingredients are fed to a wet-crushing mill. A simplification of known methods, and of the structure of known apparatus for carrying out such method is achieved by the provision that the macerating process is carried out exclusively during transport of the brewing ingredients along the circular path, and that the macerated brewing ingredients are then immediately fed to the wet-crushing mill.

5 Claims, 1 Drawing Figure

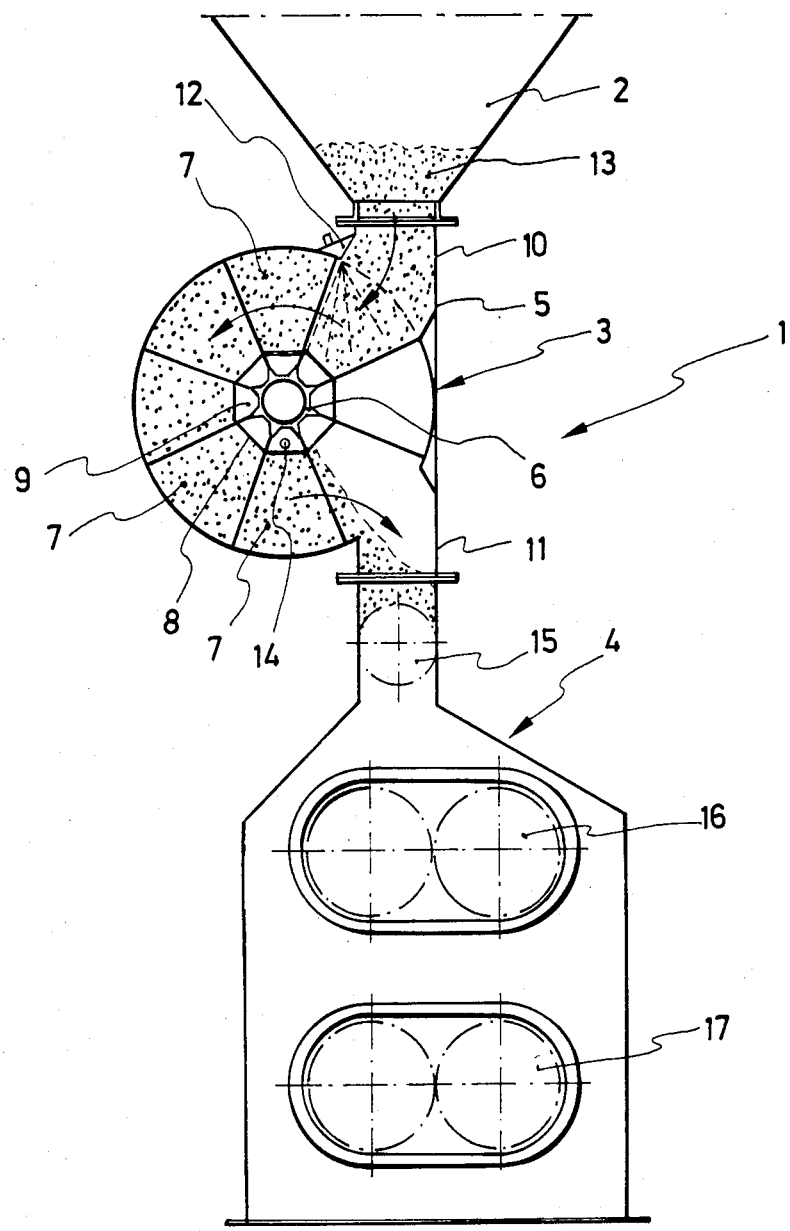

METHOD AND APPARATUS FOR MACERATING AND WET-CRUSHING BREWING INGREDIENTS

DESCRIPTION

The present invention relates to a method for macerating and wet-crushing brewing ingredients, wherein said brewing ingredients are continuously taken from a supply container and subsequently passed along a circular path in substantially equal portions while an excess of macerating water is being added thereto, the excessive macerating water being collected and discarded, and wherein said brewing ingredients are finally fed to a wet crushing mill.

The invention also relates to apparatus for macerating and wet-crushing brewing ingredients, comprising a supply container, a housing connected thereto in vertical alignment and containing a rotatable metering and macerating drum formed with radially outwards opening macerating chambers, and a wet-crushing mill disposed below the metering and macerating drum.

Within the beer-making process known methods and apparatus of the type defined above serve for macerating the brewing ingredients, generally barley and/or malt, by the addition of water to thereby condition the ingredients for the subsequent wet-crushing process. In this process, the entire volume of the brewing ingredients should be macerated as uniformly as possible and without entrapping air therein, so as to subsequently achieve a uniform crushing of the brewing ingredients.

A known method and apparatus are described in DE-PS No. 29 45 976. The apparatus includes a metering and macerating drum disposed above the wet-crushing mill. Disposed between the metering and macerating drum and the wet-crushing mill is a final macerating chute. The brewing ingredients are taken from the supply container by means of the metering and macerating drum, the macerating chambers of which are flooded with macerating water while the metering drum rotates. At a sufficient distance upstream of the lowermost point of the circular path, the macerating chambers move over a perforate sieve permitting the excessive macerating water to be discarded. Downstream of the lowermost point the brewing ingredients, with only small amounts of the macerating water adhering thereto, drops into the final macerating chute from where they are fed after a certain period of time to the wet-crushing mill by means of a feed roll.

In contrast to known methods employing only a macerating chute, the method known from DE-PS No. 29 45 976 offers the advantage that the macerating water does not have to be added to the brewing ingredients in accurately metered amounts, in place of which this method permits the brewing ingredients to be flooded, and the excessive macerating water to be removed through a sieve bottom.

There is the disadvantage, however, that the macerating apparatus has to be of considerable height due to the presence of the macerating chute. Moreover the macerated brewing ingredients have only very limited flow properties, so that they are difficult to take out of the chute.

It is therefore an object of the invention to improve a method and apparatus of the type defined above in such a manner that simplification of the method results in a corresponding structural simplification of the apparatus.

With respect to the said method this object is attained by the provision that the macerating process is carried out exclusively during transport of the brewing ingredients along the circular path, and that the macerated ingredients are then immediately fed to the wet-crushing mill.

In this manner it is possible to determine the macerating time of the brewing ingredients in accordance with the duration of their transport along the circular path. The provision that the macerated brewing ingredients are immediately fed to the wet-crushing mill eliminates the unpredictable final macerating period in a formerly used macerating chute, so that uniform crushing of the brewing ingredients is ensured.

With regard to the apparatus the stated object is attained by the provision that the size of the macerating chambers of the metering and macerating drum and the rotational speed thereof are selected so as to accomplish the complete macerating process therein, and that the wet-crushing mill immediately succeeds the metering and macerating drum.

This apparatus is particularly suitable for carrying out the method according to the invention. It offers the additional advantage that its structural height may be considerably reduced due to the elimination of the macerating chute. The macerating time of the brewing ingredients may be readily controlled by adjusting the rotational speed of the metering and macerating drum.

In a particularly advantages embodiment, the macerating chambers are each provided with a sieve-type bottom partition for the discharge of excessive macerating water at a radially inward position with respect to the metering and macerating drum. This offers the advantage that the brewing ingredients may be flooded with an uncontrolled amount of water, and that excessive water can escape vertically downwards through the sieve bottom immediately after the flooding operation. In this manner it is possible to ensure thorough wetting of the brewing ingredients while permitting a particular metering device for the supply of water to be eliminated.

According to another advantageous aspect, a water supply means is provided on the housing adjacent the top of the circular path of the metering drum. This provision ensures that at least part of the water flows into the macerating chambers simultaneously with the brewing ingredients, and that the open side of the filled macerating chambers subsequently passes below the water supply means, so that wetting of the brewing ingredients is accomplished without the danger of air inclusions.

An extension of the macerating period within the metering and macerating drum without increasing the size of the macerating chambers or reducing the rotational speed of the metering and macerating drum may be accomplished in a simple manner by the provision that the brewing ingredients inlet of the metering and macerating drum is located at an eccentric position in opposition to the direction of rotation thereof. As a result, the macerating chambers are already filled with the brewing ingredients before reaching the topmost point of the circular path.

A further extension of the macerating period may be obtained by the provision that the brewing ingredients outlet of the metering and macerating drum is located at an eccentric downstream position with respect to the direction of its rotation. These provisions result in the housing of the macerating drum assuming a crop-like configuration. The brewing ingredients inlet and outlet may extend in alignment with one another.

An embodiment of the invention shall now be described in detail by way of example with reference to the drawing, the only FIGURE of which shows a diagrammatical cross-sectional view of the apparatus according to the invention.

As shown in the drawing, an apparatus 1 for macerating and wet-crushing malt or barley comprises a supply container 2 and a macerating unit 3 located vertically therebelow and connected thereto. Disposed below macerating unit 3 and directly connected thereto is a wet-crushing mill 4.

Macerating unit 3 comprises a housing 5 with a metering and macerating drum 6 mounted therein. Along its periphery metering and macerating drum 6 is formed with a plurality of radially outwards extending macerating chambers 7 each having an outwards facing open side, their radially inner ends being closed by a sieve-type bottom partition 8. Bottom partition 8 divides the segment-shaped chambers into a respective radially outer macerating chamber 7 and a radially inner collecting chamber 9 for the macerating water.

Housing 5 of macerating unit 3 is of crop-like configuration, with metering and macerating drum 6 being disposed in the crop-like portion. Disposed on one side of the crop-like portion is a vertically extending inlet passage 10 between supply container 2 and metering and macerating drum 6. An outlet passage 11 is disposed below the metering and macerating drum in a similar manner, so that the axes of inlet passage 10 and outlet passage 11 are in linear alignment with one another. The axis of rotation of metering and macerating drum 6 extends transversely of the axis of inlet and outlet passages 10 and 11 at a laterally offset position.

Provided between inlet passage 10 and the uppermost point of housing 5 is a water supply means 12 permitting macerating chambers 7 to be flooded while they are being filled with the brewing ingredients 13 and particularly after they have been so filled. At least one of the axial end walls (not shown) of macerating unit 3 is formed with a lateral outlet 14 for discharging the macerating water from collecting chamber 9.

Wet-crushing mill 4 is located immediately below macerating unit 3 and provided with a conventional feed roller 15. The rotational speed of feed roller 15 is adjusted to that of metering and macerating drum 6 so as to prevent the brewing ingredients 13 from accumulating within outlet passage 11. Mounted below feed roller 15 is an upper crushing roller pair 16, and a lower crushing roller pair 17 again therebelow. The upper crushing roller pair may be used for a pre-crushing step, and the lower crushing roller pair, for a final crushing step.

The described apparatus is operable to carry out the method according to the invention in the following manner:

At first the brewing ingredients 13 are contained in supply container 2 on top of the apparatus. From there brewing ingredients 13 enter the upper lateral portion of macerating unit 3, specifically, a macerating chamber 7 opening towards inlet passage 10. Simultaneously with the respective chamber 7 being filled with the brewing ingredients, water is supplied thereto by water supply means 12 so that the chamber is flooded with an excess of water. As metering and macerating drum 6 rotates in the counterclockwise direction as seen in the drawings, the just filled macerating chamber 7 reaches the top of its circular path. During this transport of brewing ingredients 13, the excessive water percolates therethrough and enters collecting chamber 9 of metering an macerating drum 6 through sieve partition 8.

The thus wetted brewing ingredients 13 are slowly advanced along the circular path, so that it is completely macerated on finally leaving the respective macerating chamber. At the end of this macerating process, the brewing ingredients drop from the respective macerating chamber 7 through outlet passage 11 and onto feeding roller 15, to be immediately fed thereby to crushing roller pairs 16 and 17 of wet-crushing mill 4.

The rotating metering and macerating drum 6 is effective to ensure continuous withdrawal of brewing ingredients 13 from supply container 2, and simultaneously therewith continuous maceration of the ingredients. As the brewing ingredients are positively advanced during the macerating process, the dwelling time of the ingredients in macerating unit 3 can be accurately determined.

I claim:

1. Apparatus for macerating and wet-crushing brewing ingredients, comprising a supply container, a housing connected thereto in vertical alignment and containing a rotatable metering and macerating drum formed with radially outwardly opening macerating chambers, and a wet crushing mill disposed below said metering and macerating drum, characterized in that the size of said macerating chambers (7) of said metering and macerating drum (6) and the rotational speed thereof are relatively selected so as to carry out the complete macerating process within said metering and macerating drum (6), and said wet crushing mill (4) immediately succeeds said metering and macerating drum (6).

2. Apparatus according to claim 1, characterized in that said mascerating chambers (7) are provided with a sieve-type bottom partition (8) for the discharge of excessive mascerating water at a radially inward position with respect to said metering and mascerating drum (6).

3. Apparatus according to claim 1 or 3, characterized in that water supply means (12) is provided on said housing (5) adjacent the top of the circular path of said metering drum (6).

4. Apparatus according to claim 2, characterized in that the brewing ingredients inlet (10) of said metering and mascerating drum (6) is located at an eccentric position in opposition to the direction of rotation thereof.

5. Apparatus according to claim 1, characterized in that the brewing ingredients outlet (11) of said metering and mascerating drum (6) is located at an eccentric position in the direction of rotation thereof.

* * * * *